United States Patent
Blanc et al.

(10) Patent No.: US 6,982,956 B2
(45) Date of Patent: Jan. 3, 2006

(54) SYSTEM AND METHOD FOR CONTROLLING COMMUNICATIONS NETWORK TRAFFIC THROUGH PHASED DISCARD STRATEGY SELECTION

(75) Inventors: Alain Blanc, Tourrettes sur Loup (FR); Francois LeMaut, Nice (FR)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 09/843,315

(22) Filed: Apr. 25, 2001

(65) Prior Publication Data

US 2001/0036157 A1    Nov. 1, 2001

(30) Foreign Application Priority Data

Apr. 26, 2000    (EP)    ................................. 00480035

(51) Int. Cl.
*H04L 12/56*    (2006.01)
(52) U.S. Cl. ..................... 370/235; 370/230; 370/412; 710/52; 710/56
(58) Field of Classification Search ................ 370/229, 370/230, 230.1, 231, 235, 412, 414, 416–418, 370/468; 710/52–57
See application file for complete search history.

(56) References Cited

U.S. PATENT DOCUMENTS

| | | | | |
|---|---|---|---|---|
| 5,140,584 A | * | 8/1992 | Suzuki | 370/235 |
| 5,280,483 A | * | 1/1994 | Kamoi et al. | 370/234 |
| 6,240,067 B1 | * | 5/2001 | Sorber | 370/236 |
| 6,570,876 B1 | * | 5/2003 | Aimoto | 370/389 |

* cited by examiner

*Primary Examiner*—Alpus H. Hsu
*Assistant Examiner*—Justin M. Philpott
(74) *Attorney, Agent, or Firm*—Gerald R. Woods

(57) ABSTRACT

Congestion at an output from a node in a packet data communications network is controlled by maintaining a traffic profile based on the discardability/priority characteristics of recently received packets and by selecting at least an initial discard strategy which should be effective in ending congestion based on that profile. The profile is established by maintaining counts of the number of packets actually stored in an output buffer and of the number of packets which would have been stored if different discard strategies had been in force. The relationship of certain of the count values to a threshold determines which discard strategy is initially selected. Different, successively less intrusive discard strategies can be implemented until the congestion ends.

6 Claims, 3 Drawing Sheets

SYSTEM AND METHOD FOR CONTROLLING COMMUNICATIONS NETWORK TRAFFIC THROUGH PHASED DISCARD STRATEGY SELECTION

FIELD OF THE INVENTION

The present invention relates to communications networks and more particularly to a system and method for controlling traffic through the phased use of different discard strategies.

BACKGROUND OF THE INVENTION

At one time, the only commitment that network service providers and administrators were willing to make to their customers was that the customers' traffic would be sent through the network on a best-effort basis. Providers and administrators were unwilling to guarantee levels of network performance. For several reasons, customers began to demand network service better than best-effort service. One of those reasons was that customers were beginning to use the networks for applications critical to their businesses; i.e., for mission critical applications. Another of those reasons was that new time-critical applications began to emerge which required something beyond best-effort service for networked traffic. As an example, a growth in teleconferencing traffic increased the demand for a network service capable of delivering data that could provide smooth jitter-free audio and video images at multiple teleconferencing locations.

In an effort to satisfy customer demands for guaranteed levels of network service at a reasonable cost, Quality of Service (QoS) mechanisms were developed. Ideally, a Quality of Service guarantee is specific to the type of network traffic to which it is applied. For a telephony application, a QoS guarantee might be that data would reach its destination with no more than a specified maximum delay (latency). For a mission critical data application, a QoS guarantee might be that no frames would be dropped in transit to their intended destinations. In the following description, the terms packets and frames may be used interchangably to represent discrete units of information being transmitted through a network.

In theory, it is possible to tailor a QoS guarantee specific to every flow or connection established through a network to a particular destination. Realistically, large networks have too many concurrent flows to make such an approach practical. As a result, protocols have been developed that attempt to reduce flow complexity by mapping multiple flows into a few service levels. Network resources are allocated based on the service levels. Flows can be aggregated and forwarded according to the service class of each packet. Examples of such protocols include ATM (Asynchronous Transport Mode), Frame Relay and MPLS (Multi-Protocol Label Switching). This approach is referred to as a Class of Service approach. While a Class of Service approach may not be as flexible as a flow-specific QoS approach, Class of Service mechanisms place considerably fewer demands on network resources and thus are suitable for use in larger networks.

A typical example of a Class of Service mechanism is the recently ratified 802.1P IEEE standard for traffic prioritization. This standard defines how network packets can be assigned one of seven possible priority levels. Network devices, such as switches and routers, implementing this standard can prioritize traffic delivery according to the priority levels assigned to the network packets. Packets assigned higher priority levels are given precedence over packets with lower priority levels. Consequently, time-critical data can receive preferential treatment relative to data not considered to be time-critical.

The simplification achieved by a Class of Service approach does not come without problems. One such problem occurs where a network is used to distribute video signals, typically either in the course of teleconferencing or more recently in providing video-on-demand services. To assure that the reproduced video at a destination does not flicker, pause or simply go blank, digital video flows are normally assigned a high priority. However, video traffic may impose heavy demands on available network bandwidth and may also be highly bursty with intermittent, irregularly-occurring short term bandwidth requirements that far exceed any average or long term bandwidth requirements. Consequently, it can be assumed that routers or switches used to switch such traffic at nodes of telecommunications networks will intermittently become congested; that is, unable to cope with short term network requirements even where the long term or average network requirements are not excessive.

When congestion does occur, a single video traffic data stream may preempt all bandwidth available at a given output port of a switch or router, preventing the device from serving any other traffic intended for the same output port. This can result in the suppression of network control messages which, although not ordinarily considered high priority or requiring the use of much network bandwidth, may play a crucial role in the execution of network management tasks needed to prevent the kind of congestion just mentioned.

While, as a general class, video traffic needs to be given high priority to avoid excess latency, there can be differences among video packets, even those intended for the same destination. Different specific types of video packets may be more or less important in reconstructing a video image at its destination. For example, an MPEG (Motion Picture Experts Group) standard available from ISO (International Standards Organization) specifies schemes for compression, transmission and decompression of video signals. The MPEG compression scheme can reduce transmitted video by a factor of 6 to 30 times by recognizing that a considerable amount of video information is repeated on a frame-by-frame basis. Data compression is achieved by not retransmitting portions of video image which don't change from one frame to the next. A video image is broken down into a number of a pel-by-pel regions called blocks. Four blocks are joined to create a 16 by 16 macroblock. Macroblocks which are not changed from one frame to the next are not re-encoded in subsequent frames. Runs of macro blocks are called slices. Typically, an entire video frame can be reconstructed from slices. Because each slice begins with a unique header, the slice structure allows a receiver to be re-synchronized at the beginning of the slice if data has become corrupted.

To avoid the propagation of errors and to allow periodic resynchronization of the video signals, the MPEG standard defines one type of video frame, an I-frame, which is a complete frame (one that does not rely on information from other frames) that is transmitted approximately once every 12 frames. The MPEG standard also defines P-frames, which rely on information received in previous frames in order to fully define a video image, and B-frames, use information found in both preceding and following frames, in order to fully define a video image. Motion vectors can be encoded to permit portions of a picture that move from one frame to the next to be used in recreating images from B-frames.

It is clear from even this brief overview of MPEG frames that not all of the transmitted frames of a video flow are equally important in reconstructing a video image at its intended destination. I-frames deserve the highest priority since they enable periodic resynchronization. Decoders which receive MPEG video signals can accommodate some loss or delay of P-frames and B-frames without causing any noticeable degradation in the quality of a reconstructed image.

Comparable schemes are defined by an existing H.261 videoconferencing standard and in GSM (Global System for Mobile Communication) specifications promoted by the GSM Association located in Dublin, Ireland.

A traditional class of service approach to traffic management may not be optimal for encoding schemes of the type described above. Under a traditional class of service approach, all of the packets in a given flow are assigned the same priority level, necessarily the priority level needed for the most critical of the packets in the flow. As a result, the packets in a particular flow may preempt the bandwidth available at an output port of a network device even that some of the packets may not be critical to operations to be performed at the flow's destination.

SUMMARY OF THE INVENTION

The present invention improves upon a traditional class of service approach by managing network traffic as a function of both packet priority levels and discard-eligibility tags which may be assigned to individual packets. In the absence of congestion, all packets intended for a particular destination are transferred to the output buffer on the path to the destination. A first counter in a set of counters keeps track of the actual occupancy of the output buffer. Other counters in the set keep track of what the output buffer occupancy would be if specific discard strategies had been effect for the packets already loaded into the output buffer. When congestion is detected, the counter contents are used to determine which of the available discard strategies should be selected to end the congestion with the least possible impact on traffic flow. An implicit assumption is that the characteristics of the traffic which will be received in the near future are not likely to be significantly different from the characteristics of the most recently received traffic. The selected discard strategy is initiated and continued until the congestion ends.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following technical description when read in conjunction with the accompanying drawings wherein:

TECHNICAL DESCRIPTION

Figure 1:
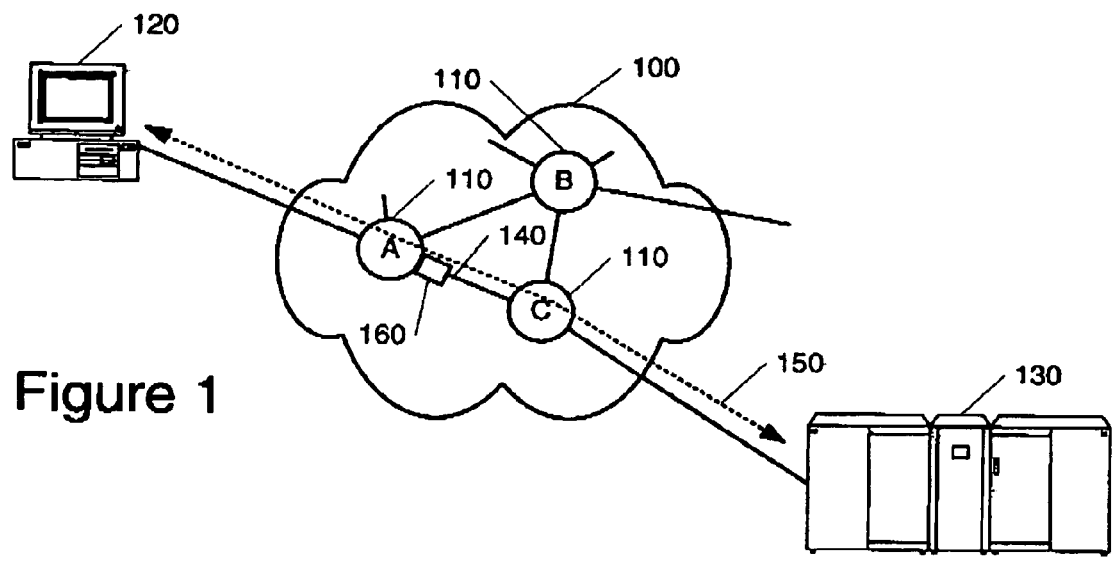
FIG. 1 illustrates a simple data communications network environment for use of the present invention.

FIG. 1 illustrates the environment in which the present invention is implemented. The environment is a communications network, only a portion 100 of which is shown. The illustrated portion 100 includes three nodes 110 which are used in forwarding data between end points such as workstation 120 and server 130. In a typical network, the nodes are interconnected through communication lines such as line 140. Depending upon the technologies and protocols employed in the network, the communications lines may be permanent or temporary (dial-up) connections. While different nodes in the network may perform the data forwarding functions in different ways, what all of the nodes have in common is that all include an output buffer, such as buffer 160, used to provide temporary storage of output data before the data is transferred to another node or to a destination end point system.

Figure 2:
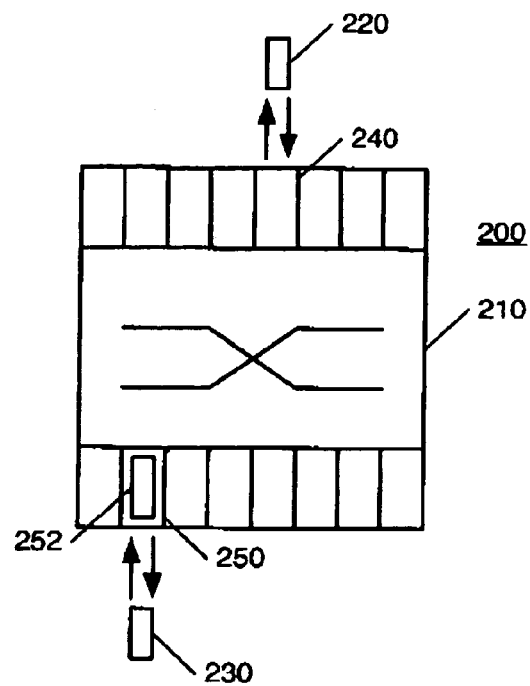
FIG. 2 is a more detailed view of a network node at which the invention may be implemented.

As noted above, the nodes in a network may perform the data forwarding functions in different ways. FIG. 2 is a more detailed view of a network node 200 implementing switching technology. The switch includes a switch fabric 210 used to switch data packets, such as packets 220 and 230, between bi-directional ports and port adapters such as 240 and 250. Each of the output ports includes an egress or output buffer 252 which provides temporary storage for packets directed to the output port through the switch fabric 210.

An output buffer is typically considered to be congested when a predetermined percentage of its storage capacity is currently being used to provide temporary storage of data packets. When congestion has been detected at a particular output buffer, the present invention is used to select and initiate a discard strategy that is applied to subsequently received packets. The goal of the selective discard process, which will be described in more detail later, is to allow critical, high-priority packets to continue to loaded into the output buffer while selectively blocking less critical packets. The selective discard process is intended to prevent the output buffer from becoming completely filled, which would result in the discard of all data directed toward the buffer without regard to assigned priority levels.

Figure 3:
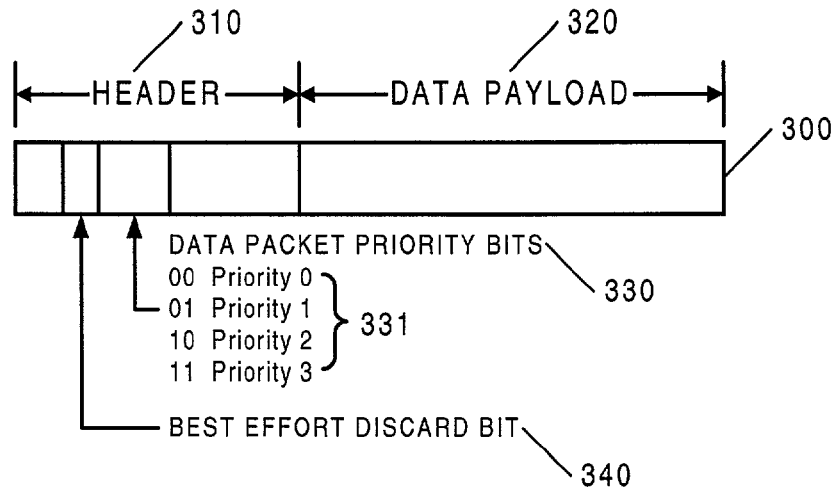
FIG. 3 illustrates a data packet header capable of carrying priority and discard-eligibility information required to implement the present invention.

FIG. 3 shows a largely generic data packet structure 300. Depending upon the protocols and technologies employed in a particular network, the formatting, size and structure of data packets will differ from one network to the next. Regardless of differences in details, all types of data packets typically include a header section 310 and a data payload section 320, the latter carrying end-user information. Where switching technology is employed, the packet length may be fixed. Fixed size packets facilitate the use of high throughput switch fabrics which can handle aggregated data flows measured in tens, if not in hundreds, of gigabits per second.

The header section 310 contains, among other things, the necessary control information for directing the data packet through the switch fabric to a particular output port. In accordance with the present invention, specific bit positions or fields in the header section contain two types of information required by the invention. First, a field 330 carries an indication of the priority level of the packet. Another field 340, possibly only one bit long, carries a discard-eligibility indicator which determines whether or not the packet may be selectively discarded when congestion is detected at the output buffer.

The criteria and methodology employed in deciding which priority level to assign to a particular packet or whether that packet should be considered eligible for discard are beyond the scope of the present invention. Priority levels and discard eligibility are ordinarily established by the applications responsible for generating the packets. The presence of a priority level identifier and a discard eligibility indicator is assumed for each packet processed at a network device implementing the invention.

In one embodiment of the invention, suitable for implementation in a high speed network switch, a set 331 of four packet priority levels (0–3) are assumed with priority 0 being the highest. The four priority levels can be defined in a two bit field in the packet header. The invention is not, of course, limited to systems having four packet priority levels. The system designer may choose to allow more or fewer priority levels depending upon system performance requirements. A set of counters is associated with each output buffer in a network device for implementation of the present invention. As will be explained below, the minimum number of counters in each set is one greater than the maximum number of assignable packet priority levels.

Figure 4:
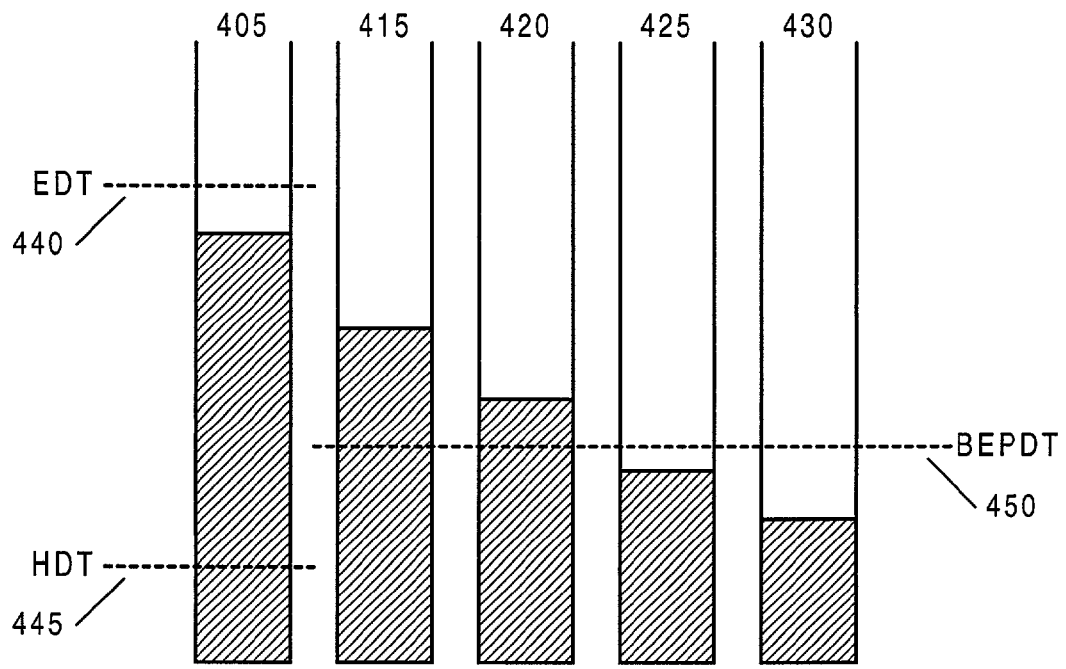
FIG. 4 illustrates counters and thresholds required for selective discard operations in accordance with the invention.

Referring to FIG. 4, if the existence of four possible packet priority levels is assumed, a set of five counters 405, 415, 420, 425 and 430 is associated with an output buffer in a network device. Counter 405 can be viewed as a main counter which tracks the actual occupancy level or loading of the associated output buffer. Counter 405 is incremented each time a packet is loaded into the buffer and is decremented each time a packet leaves the buffer. The characteristics (priority level and discard eligibility) of any packet actually loaded into the output buffer are ignored by counter 405.

The function of the remaining four counters 415, 420, 425 and 430 is to track what the occupancy level of the output buffer would have been if specific discard strategies had been effect for the packets currently stored in the output buffer. Control logic for each counter examines each packet being loaded into the output buffer and increments the associated counter only if the packet meets predetermined criteria.

Specifically, counter 415 is incremented each time a packet is loaded into the buffer unless the packet is already tagged as discard-eligible and has the lowest possible priority level; that is, priority level 3. The next counter 420 is incremented for all packets excluding packets tagged as discard-eligible and having either of the lowest two possible priority levels. Counter 425 is incremented upon the loading of any packet excluding any discard-eligible packet having one of the three lowest priority levels. Finally, counter 430 is incremented for each loaded packet, excluding any packet tagged as discard-eligible without regard to its priority level.

While decisions whether to increment the count in counters 415, 420, 425 and 430 depends on the characteristics of the individual packets, the count in every counter is decremented each time a packet leaves the output buffer without regard to the actual characteristics of that packet.

Given the different criteria used for incrementing the counters 415, 420, 425 and 430, it can be seen that the current counts in the counters is a reflection of how effective possible discard strategies would have been if those discard strategies had been in effect over the last n packets where n is the number of packets currently stored in the output buffer. If congestion occurs, knowing the effectiveness of different discard strategies for recently received packets makes it possible to select a discard strategy which is likely to end the congestion while minimizing the impact on packet traffic.

In a preferred embodiment, the onset of congestion at the output port is detected when the actual count in main counter 405 increases beyond an Enable Discard Threshold (EDT) 440. At the onset of congestion, the process of selecting and implementing a discard strategy referred to generally above and to be described in more detail below is initiated. The EDT value is not necessarily a fixed value but may be established as a fixed percentage of the capacity of the output buffer. The objective in selecting a particular EDT value is to assure that a selective discard process is initiated early enough to prevent even a burst of data from filling the output buffer to its maximum capacity, at which point all incoming data would have to be discarded without regard to its priority level or discard eligibility.

The end of congestion at an output buffer is defined as occurring when the actual count in main counter 405 falls below a Halt Discard Threshold (HDT) 445 which may also be established as a fixed but lower percentage of the capacity of the output buffer. Selective discarding ends when the main count falls below the HDT value, which means that all packets directed to the output buffer will be loaded into the buffer without regard to their priority level or discard eligibility.

Once selective discarding is initiated as a result of the count in main counter 405 exceeding EDT, selective discarding continues even as the count falls below EDT. Selective discarding is continued until the count in main counter 405 falls to a value below HDT. The zone between EDT and HDT provides a hysteresis effect, which prevents rapid cycling between no-discard and selective-discard modes of operation.

A third threshold value, the Best Effort Priority Discard Threshold (BEPDT) 450, is employed in determining which of the possible discard strategies is most appropriate to implement once congestion is detected. When the onset of congestion is detected, the system examines the current counts in the counters 415, 420, 425 and 430 to determine which contains a count closest to but greater than BEPDT. The system then identifies the discard strategy which controls the number of packets counted in that counter. The identified discard strategy is selected and applied to packets newly received at the output port. Incoming packets are either passed or discarded in accordance with the strategy until the count in the identified counter falls below BEPDT.

Once the count in the initially-identified counter falls below BEPDT, the current discard strategy is terminated and the next less severe discard strategy is initiated. Effectively, selection of the discard strategy proceeds from more severe strategies towards less severe strategies.

In the example illustrated in FIG. 4, counter 420 contains the count closest to but greater than BEPDT. As noted earlier, the counters 415, 420, 425 and 430 maintain counts of the number of packets the output buffer would contain if different discard strategies had been in force during the receipt of all packets presently stored in the output buffer. The discard strategy associated with counter 420 calls for discard of any packet tagged as being eligible for discard and having either of the two lowest possible priority levels; that is, priority level 3 or priority level 2. This discard strategy will be selected and implemented at the onset of congestion. Since the count maintained in every counter in the set in decremented every time a packet leaves the output buffer, the selective discard or blocking of some incoming packets will result in a decline in the buffer's occupancy level over time.

Eventually, the count in counter 420 will fall below the BEPDT threshold. When that happens, the system will select and implement the next less severe discard strategy, which in this case calls for the discard of only those packets which are tagged as discard eligible and which are assigned the lowest possible priority level, that is, priority level 3. This discard strategy will be implemented and will be tracked by monitoring the count in the associated counter 415.

While the change in the discard strategy being implemented means that fewer packets will be discarded than was previously the case, the number of packets stored in the output buffer should continue to decline, resulting in falling counts in each of the five counters. Eventually, the number of packets stored in the output buffer, tracked by the count in counter 405, will fall below HDT, signalling the end of the congested state. When the congested state ends, selective discard ends. All packets directed to the output buffer will be loaded into the buffer without regard to their discard eligibility or priority level.

Figure 5:
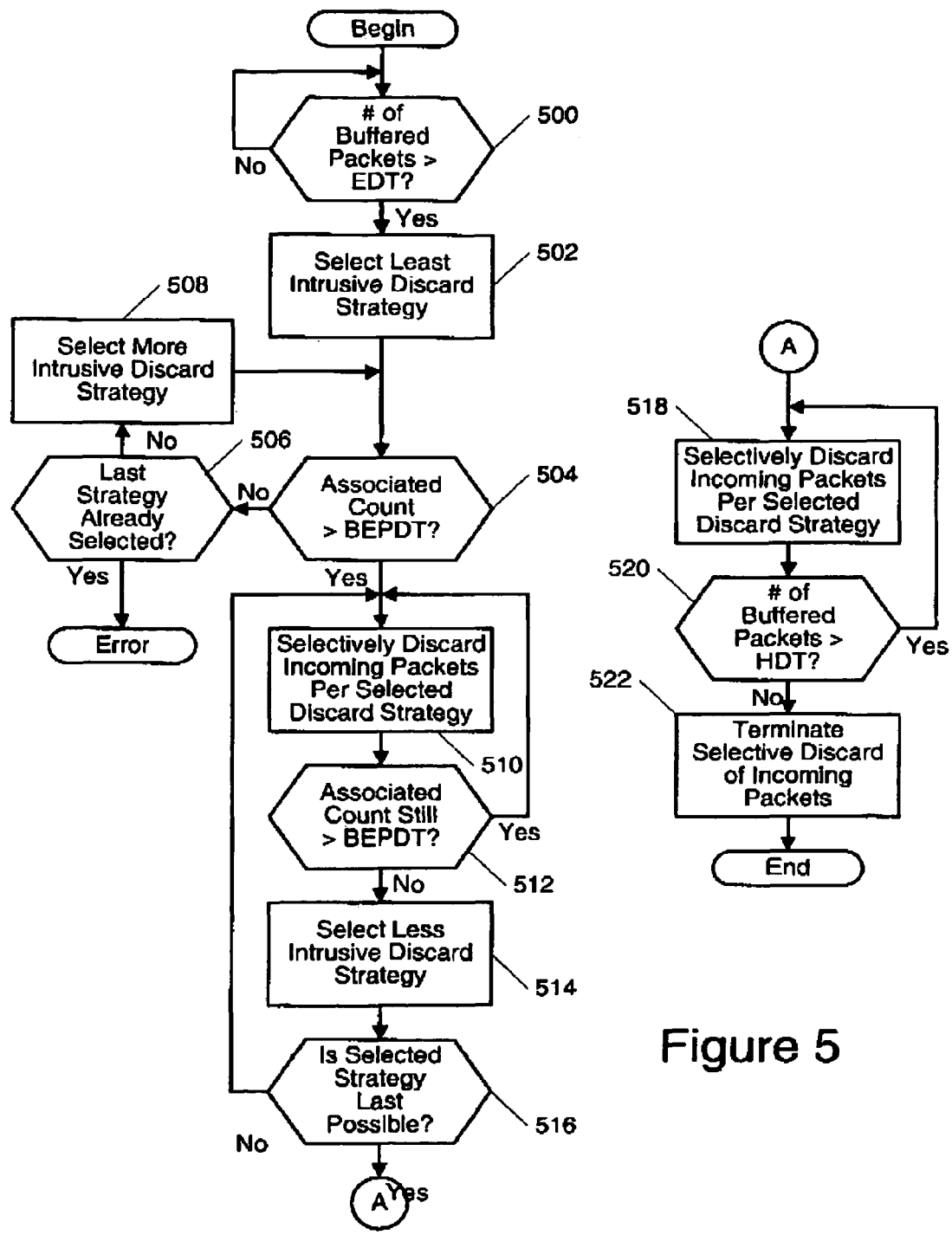
FIG. 5 is a flowchart of method steps performed when implementing the invention.

FIG. 5 is a flowchart of method steps that are performed in carrying out a preferred implementation of the present invention. The number of packets stored in the output buffer is continually compared to the threshold value EDT in an operation 500. As long as the number of stored packets is less than or equal to EDT, while packets directed toward the output buffer are stored there without regard to their priority level or discard eligibility. If, however, operation 500 indicates that the number of stored packets has exceeded EDT, selection of the most appropriate discard strategy is begun by initially selecting the least intrusive discard strategy from the set of possible discard strategies in operation 502. The least intrusive discard strategy is that discard strategy which results in the discarding of the fewest number of packets in the data stream. For example, in the implementation described thus far, the least intrusive discard strategy would be that strategy which results in the discard of only discard-eligible packets to which the lowest possibility priority level is assigned.

The current count in the counter associated with this discard strategy is compared to the threshold BEPDT in an operation 504. A current count less than or equal to the threshold value BEPDT indicates that the least intrusive discard strategy would probably not be effective in ending the congested state. Since there is no point in selecting a discard strategy that is not likely to be affected, the system first checks in operation 506 whether the selected strategy is the last possible strategy in the set of available strategies. The need for this test is described below. Assuming the response to operation 506 is negative, meaning there are other more intrusive discard strategies which have yet to be selected, one of those discard strategies is selected in operation 508. The current count in the counter associated with that discard strategy is again tested in operation 504. If the current count is still not greater than the BEPDT threshold, the loop consisting of operations 504, 506 and 508 is repeated either until there are no further strategies to be selected or until the count associated with the last-selected discard strategy is found to be greater than BEPDT is detected. If the last possible discard strategy is found to have already been selected in operation 506 without finding any associated counts greater than BEPDT, than by definition an error condition exists because such finding would mean that none of the possible discard strategies is likely to be effective in ending congestion.

The discard strategy which is selected in the steps described thus far is the first strategy found to have an associated count greater than the BEPDT threshold. It is this strategy which is finally selected and implemented. Incoming packets are selectively discarded in an operation 510 in accordance with the implemented discard strategy. Once selected discarding begins, the count in the counter associated with that strategy is continually monitored in operation 512 to determine whether that counter remains above the BEPDT threshold. Discarding continues using the selected strategy until operation 512 shows that the associated count has fallen below the BEPDT threshold. When that happens, the system looks for a less intrusive discard strategy in an operation 514 and determines in an operation 516 whether the strategy found is the last (least intrusive) possible strategy.

Assuming the newly selected discard strategy is not the last possible strategy, selective discard of incoming packets is initiated using the newly selected less-intrusive strategy. The discard operation is implemented using the method steps 510, 512, 514 and 516 already described above.

Once operation 516 shows that the last possible discard strategy has been selected, indicated by a positive response, the method proceeds along a different path. As indicated by operation 518, incoming packets are selectively discarded using the last or least intrusive discard strategy. At this point, the system would resume monitoring the number of packets actually stored in the output buffer (operation 520). As long as the number of buffered packets remains greater than the HDT threshold value, selective discarding continues. Once operation 520 shows that the number of buffered packets fallen to HDT or lower, the congested state is deemed to have ended and the selective discard process is terminated in operation 522. Subsequently, none of the packets directed to the output buffer is discarded, at least until the buffer occupancy again climbs past the high threshold value EDT.

In the implementation described above, the selection of discard strategies is straightforward with each successively selected strategy resulting in the discard of fewer packets based strictly on the discard eligibility and priority levels of the packets. The invention can be applied to more complex sequences of discard strategies as long as those strategies result in the loss of fewer and fewer packets as the selection moves from one discard strategy to the next.

What is claimed is:

1. A method for controlling congestion at an output from a node in a data communications network wherein data is transmitted in packets, each packet having a discardability characteristic, said method comprising the steps of:
   establishing a set of available, alternative discard strategies for packets having different discardability characteristics;
   maintaining a profile of packets recently received at the output, the profile reflecting the discardability characteristics of said packets, wherein the step of maintaining a profile further comprises the steps of maintaining a count of the number of packets actually stored in an output buffer at the output, and maintaining counts of the number of said packets which would have been stored in the output buffer if different discard strategies in a set of available discard strategies had been in effect during the receipt of the packets actually stored in the output buffer,
   monitoring the output to detect the onset of congestion;
   upon detection of congestion, using the profile to select an initial discard strategy;
   initiating the selected initial discard strategy;
   continuing to monitor the degree of congestion at the output; and
   selecting and initiating one or more subsequent discard strategies as the degree of congestion changes, wherein each successively initiated discard strategy is intended to result in the discard of fewer packets than the previously initiated discard strategy.

2. A method as set forth in claim 1 wherein the step of selecting an initial discard strategy further comprises the step of comparing each of said maintained counts to a predetermined threshold and selecting the discard strategy associated with the count closest to but greater than the predetermined threshold.

3. A method as set forth in claim 2 wherein the step of selecting and initiating one or more subsequent discard strategies further comprises the steps of:
- monitoring the count associated with the currently initiated discard strategy; and
- selecting a different discard strategy when the monitored count falls below the predetermined threshold.

4. A system for controlling congestion at an output buffer in a node in a packet data communications network, said system comprising:
- a first counter for maintaining a count n of the number of packets actually stored in the output buffer, wherein n is a whole number;
- a plurality of additional counters, each additional counter being associated with a different predetermined discard strategy and maintaining a count of the number of packets which would have been stored in the output buffer had the associated discard strategy been in effect during receipt of the last n packets;
- discard initiation logic for generating a congestion-detected signal when the count n exceeds a predetermined high threshold;
- discard strategy selection logic for selecting and initiating one or more sequential discard strategies as a function of the counts maintained in said plurality of additional counters; and
- discard termination logic for terminating discarding of packets when the count n falls below a predetermined low threshold.

5. A system for controlling congestion as set forth in claim 4 wherein said discard strategy logic further comprises:
- compare logic for comparing the count in each of said additional counters to a predetermined intermediate threshold; and
- selection logic for initially selecting the discard strategy associated with the additional counter having a counter closest to and greater than the predetermined intermediate threshold.

6. A system for controlling congestion as set forth in claim 5 wherein said discard strategy logic further comprises logic for detecting when the count associated with the currently selected discard strategy has fallen below the predetermined intermediate threshold and for selecting a different discard strategy to be initiated.

* * * * *